Oct. 28, 1924. Re. 15,937

J. C. FRITTS

CAR DOOR LOCK

Original Filed April 8, 1922

INVENTOR.
JAMES C. FRITTS

BY

Bonham & Goldsmith

ATTORNEYS

Reissued Oct. 28, 1924. Re. 15,937

UNITED STATES PATENT OFFICE.

JAMES C. FRITTS, OF SCRANTON, PENNSYLVANIA.

CAR-DOOR LOCK.

Original No. 1,456,611, dated May 29, 1923, Serial No. 550,597, filed April 8, 1922. Application for reissue filed August 6, 1924. Serial No. 730,544.

*To all whom it may concern:*

Be it known that I, JAMES C. FRITTS, a citizen of the United States, residing at Scranton, in the county of Lackawanna and State of Pennsylvania, have invented a certain new and useful Improvement in Car-Door Locks, of which improvement the following is a specification.

My invention relates to locks for car doors, and more particularly for the doors of box freight cars. Heretofore it has been the practice to lock the doors of such cars by means of the usual bolt or pin which is then fastened by a wire and lead seal, to prevent removal. This means for securing the lock has, however, proved to be very inadequate, as the wires and seals are quite easily broken and many thefts have been committed by breaking the locks in this manner. The use of padlocks and keys has also been proposed, but this is inconvenient and unsatisfactory, since the keys are often lost or find their way into the hands of dishonest employees, or other unauthorized persons, who thus obtain access to the cars.

The object of my invention is to provide a car door lock of simple, strong, and durable construction, and having a sliding bolt adapted to be securely fastened by a transverse rivet, with means for preventing the easy removal of said rivet.

The invention claimed is hereinafter fully set forth.

Figure 1:
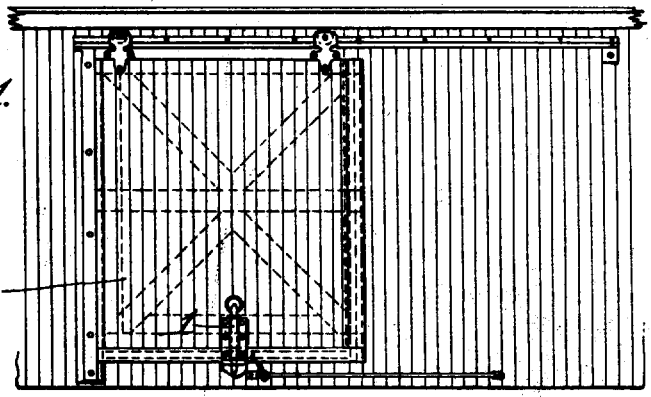
Figure 3:
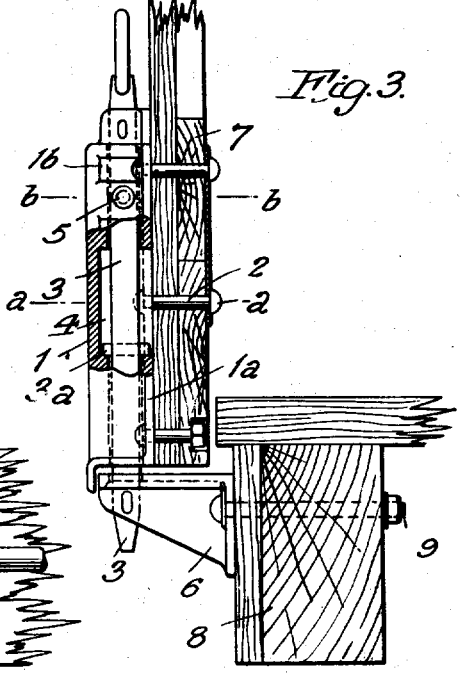
Figure 2:
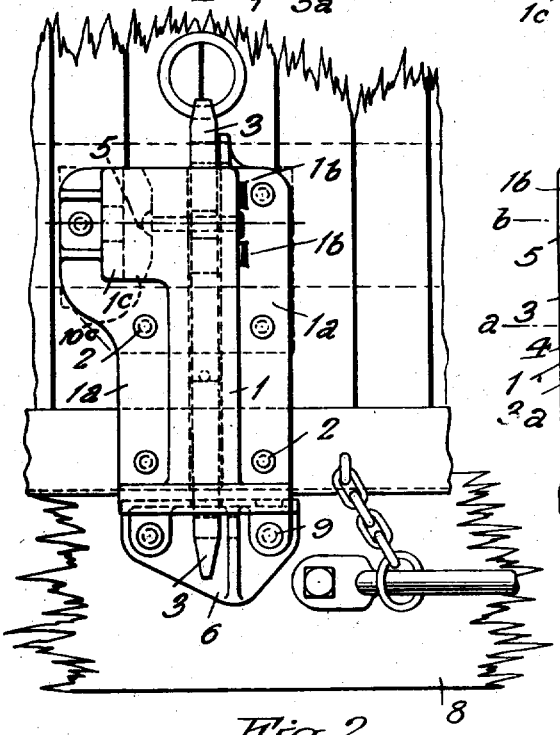

In the accompanying drawings: Figure 1 is a side elevation of a portion of a box freight car, showing one form of my improved lock, applied thereto; Fig. 2, a side view, in elevation, of the lock upon a larger scale; Fig. 3, a transverse section through a portion of the car frame and car door, showing the lock partly in an end elevation and partly in section; and Figs. 4 and 5, horizontal sections taken on the lines *a—a* and *b—b*, respectively, of Fig. 3.

Figure 4:
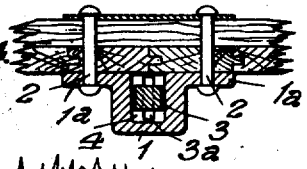
Figure 5:
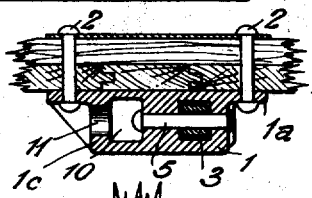

In the practice of my invention, referring descriptively to the specific embodiment thereof which is herein exemplified, the lock comprises two portions, the housing portion, adapted to be attached to the door, and the bracket portion, adapted to be fastened to a fixed part of the car body or frame. The housing portion is preferably formed of a casting, 1, provided with lateral flanges $1^a$, for the reception of fastening bolts, 2, and having an opening through the full length of the casting for a sliding bolt 3. The bolt, 3, may be provided with a transverse stop pin, $3^a$, in the cored passage 4, which is open at the back of the casting, as shown in Figs. 3 and 4, for the insertion of the stop pin, before the housing is bolted to the door, 7. The stop pin limits the vertical or sliding movement of the bolt within the casting.

For the purpose of fastening the bolt in its lower or locking position, I provide a transverse rivet, or locking pin, 5, extending through openings in the casting and in the bolt, which openings register with each other in this position of the bolt, the rivet being then headed over at its end to securely fasten the bolt and prevent its removal. The rivet is preferably formed with a recess in its end to facilitate the operation of heading over the rivet upon the housing.

In order to hold the rivet or locking pin during the riveting operation, I may provide a flange or wall, $1^c$, formed integrally upon the casing of the outer side of the head of the rivet, whereby a piece of iron or other wedge may be inserted between said wall and rivet head to act as a backing and permit one man to head the rivet over quickly and efficiently. As shown in the drawing, the wall, $1^c$, is joined at its outer end with the main body of the casing forming a vertical opening, 10, in which the wedge may be inserted. The wall, $1^c$, is also provided with an opening 11, in line with the rivet for permitting the same to be inserted through the casing and sliding bolt.

Another feature of my improvement consists in providing means for protecting the headed over end of the rivet, such as the lugs, $1^b$, formed upon the casting, both above and below the end of the rivet, whereby it will be difficult to obtain access to the rivet with a tool for the purpose of filing or cutting off the end of the same.

The bracket or keeper portion, 6, of the lock is shown as rigidly secured to the car sill, 8, beneath the car door, by bolts 9, said bracket having an opening through which the bolt, 3, extends, when in locking position. The bracket may be formed of a casting of any suitable shape or size. It will be obvious that when the car door is closed and locked, with the bolt securely held in place by the rivet, it will be extremely difficult for thieves to break the lock without making considerable noise and disturbance, which would betray their operation. When it is desired to open the car door by those duly authorized to do so, the headed over end of the rivet may be cut off by means of an ordinary cold chisel and hammer.

If desired, the bolt, 3 may also be secured by a wire and seal connection passing through suitable holes in the bolt and in the housing or bracket.

I have illustrated and described herein what I now consider to be the preferred form of my invention. However, it is to be expressly understood that I do not limit myself thereto as many changes may be made in points of detail and other embodiments resorted to without deviating from the true spirit and scope of my invention.

I claim as my invention and desire to secure by Letters Patent:

1. A car-door lock, comprising a housing adapted to be secured to the door and having a longitudinal passage therethrough and a transverse hole intersecting said passage, a bracket adapted to be secured to the car sill and having an opening adapted to register with said passage, a locking bolt adapted to occupy said passage and opening and having a transverse hole therethrough and a rivet adapted to be passed through said holes and to be headed over to prevent its withdrawal.

2. A car-door lock, comprising a housing adapted to be secured to the door and having a longitudinal passage therethrough and a transverse hole intersecting said passage, a bracket adapted to be secured to the car sill and having an opening adapted to register with said passage, a locking bolt adapted to occupy said passage and opening and having a transverse hole therethrough, a rivet adapted to be passed through said holes and to be headed over to prevent its withdrawal, and lugs on said housing to protect the headed over end of the rivet and render it difficult of access.

3. A car door lock comprising a housing having a longitudinal passage therethrough and a transverse hole intersecting said passage, a bracket having an opening adapted to register with said passage, a locking bolt adapted to occupy said passage and opening and having a transverse hole therethrough adapted to register with said first mentioned transverse hole, a rivet adapted to be passed through said holes and be headed over, a plate or flange on said housing formed with an opening to receive a wedge or similar tool to provide an abutment for said rivet while being headed over, and lugs on the other side of said housing to protect said headed over end.

4. A car door lock comprising a housing having a longitudinal passage therethrough and a transverse hole intersecting said passage, a bracket having an opening adapted to register with said passage, a locking bolt adapted to occupy said passage and opening and having a transverse hole therethrough adapted to register with said first mentioned transverse hole, a rivet adapted to be passed through said holes and be headed over, and a plate or flange on said housing formed with an opening or passage adapted to receive a wedge or similar tool to provide an abutment for said rivet while being headed over.

5. A car door lock comprising a housing having a passage therethrough and a hole also therethrough intersecting said passage, a keeper having an opening adapted to register with said passage, a locking bolt adapted to occupy said passage and opening and having a hole therethrough adapted to register with said first mentioned hole, a rivet adapted to be passed through said holes and be headed over, and means on said housing adapted to receive a wedge or similar tool to provide an abutment for said rivet while being headed over.

6. A car door lock comprising a housing having a passage therethrough and a transverse hole intersecting said passage, a keeper having an opening adapted to register with said passage, a locking bolt adapted to occupy said passage and opening and having a transverse hole therethrough adapted to register with said first mentioned transverse hole, a rivet adapted to be passed through said holes and be headed over, and a wall formed integrally with said housing adapted to receive a wedge or similar tool to provide an abutment for said rivet while being headed over, said wall being provided with an opening in alignment with said transverse hole in the housing to enable the rivet to be inserted through the said opening into the said transverse holes when the latter are in register.

7. A car door lock comprising a housing having a passage therethrough and a transverse hole intersecting said passage, a keeper having an opening adapted to register with said passage, a locking bolt adapted to occupy said passage and opening and having a transverse hole therethrough adapted to register with said first mentioned transverse hole, a rivet adapted to be passed through said holes and be headed over, and a wall on said housing provided with a passage in which a wedge is adapted to be inserted between said wall and rivet head to act as a backing to head the rivet.

8. A car door lock comprising a housing having a passage therethrough and a transverse hole intersecting said passage, a keeper having an opening adapted to register with said passage, a locking bolt adapted to occupy said passage and opening and having a transverse hole therethrough adapted to register with said first mentioned transverse hole, a rivet adapted to be passed through said holes and be headed over, and a wall on said housing provided with a passage transversely arranged with respect to said rivet in which a wedge is adapted to be inserted between said wall and rivet head to act as a backing to head the rivet, said wall being also provided with an opening in alignment with said transverse hole in the housing to enable the rivet to be inserted through said opening into the transverse holes in said housing and locking bolt when said holes are in register.

In testimony whereof I have signed this specification.

JAMES C. FRITTS.